United States Patent
Allam

(10) Patent No.: US 8,539,776 B2
(45) Date of Patent: Sep. 24, 2013

(54) GENERATING POWER USING AN ION TRANSPORT MEMBRANE

(75) Inventor: Rodney J. Allam, Chippenham (GB)

(73) Assignee: GTLpetrol LLC, New York, NY (US)

( * ) Notice: Subject to any disclaimer, the term of this patent is extended or adjusted under 35 U.S.C. 154(b) by 0 days.

(21) Appl. No.: 13/183,340

(22) Filed: Jul. 14, 2011

(65) Prior Publication Data
US 2012/0031100 A1  Feb. 9, 2012

Related U.S. Application Data

(60) Provisional application No. 61/364,293, filed on Jul. 14, 2010.

(51) Int. Cl.
*F02C 6/04* (2006.01)
(52) U.S. Cl.
USPC ........................................................... 60/785
(58) Field of Classification Search
USPC ........ 60/39.12, 726, 730, 736, 780, 783–785, 60/791
See application file for complete search history.

(56) References Cited

U.S. PATENT DOCUMENTS

| | | | |
|---|---|---|---|
| 6,293,084 B1 | 9/2001 | Drnevich | |
| 6,539,719 B2 | 4/2003 | Prasad et al. | |
| 7,690,204 B2 * | 4/2010 | Drnevich et al. | 60/780 |
| 7,934,383 B2 * | 5/2011 | Gutierrez et al. | 60/780 |
| 2002/0174659 A1 * | 11/2002 | Viteri et al. | 60/780 |
| 2004/0016237 A1 | 1/2004 | Marin et al. | |
| 2004/0128975 A1 | 7/2004 | Viteri | |
| 2007/0033942 A1 * | 2/2007 | Benz et al. | 60/772 |
| 2008/0202123 A1 * | 8/2008 | Sullivan et al. | 60/781 |
| 2011/0023498 A1 * | 2/2011 | De Koeijer et al. | 60/780 |
| 2011/0067405 A1 * | 3/2011 | Armstrong et al. | 60/752 |

FOREIGN PATENT DOCUMENTS

| | | |
|---|---|---|
| JP | 11117711 A | 4/1999 |
| JP | 2008111419 A | 5/2008 |

OTHER PUBLICATIONS

International Search Report and Written Opinion issued International Application No. PCT/US2011/044078, Feb. 23, 2012, 8 pages.
International Search Report and Written Opinion issued in International Application No. PCT/US2011/055983, mailed Jun. 18, 2012, 8 pages.

* cited by examiner

*Primary Examiner* — Phutthiwat Wongwian
(74) *Attorney, Agent, or Firm* — Fish & Richardson P.C.

(57) ABSTRACT

A system may include a compressor, a heat exchanger and an ITM. The compressor is configured to receive an air stream and compress the air stream to generate a pressurized stream. The heat exchanger is configured to receive the pressured stream and indirectly heat the pressurized stream using heat from an oxygen stream from an Ion Transport Membrane (ITM). The ITM is configured to receive the heated pressurized stream and generate an oxygen stream and the non-permeate stream, wherein the non-permeate stream is passed to a gas turbine burner and the oxygen stream is passed to the heat exchanger.

6 Claims, 2 Drawing Sheets

GENERATING POWER USING AN ION TRANSPORT MEMBRANE

RELATED APPLICATION

This application claims priority under 35 U.S.C. §119 to U.S. Provisional application No. 61/364,293, filed Jul. 14, 2010, the entire disclosure of which is incorporated herein by reference.

TECHNICAL FIELD

This invention relates to integrating an ion transport membrane with a gas turbine.

BACKGROUND

Hydrocarbon and carbonaceous feedstock can be converted into H2 and CO synthesis gas mixtures with varying ratios of H2 to CO. Feedstock may include coals, natural gas, oil fractions, bitumen and tar-like refinery wastes, pet-coke and various forms of biomass. The synthesis gas mixtures can be converted into valuable hydrocarbons and chemicals using catalytic processes.

SUMMARY

In some implementations, a system can include an Ion Transport Membrane (ITM) module which separates pure oxygen from pressurized heated air integrated with a gas turbine to produce oxygen. An importantuse for the system is Integrated Gasification Combined Cycle (IGCC) systems with or without $CO_2$ capture to maximize or otherwise increase system efficiency. These implementations may enable diluent gas with less than 1% $O_2$ to be mixed safely with $H_2$ and/or ($H_2$+CO) fuel gas. In addition, the combination of the ITM and the gas turbine minimize or otherwise reduce heat energy released in the ITM system that is transferred to the steam system. The air feed to the ITM module may be heated indirectly so that the partial pressure of $O_2$ in the air is not degraded by direct combustion in the feed air stream. This maximizes or otherwise increases $O_2$ recovery and minimizes or otherwise reduces air flow for a fixed $O_2$ production and membrane area. Also, some implementations may avoid or otherwise substantially reduce possible contamination of the ITM membrane from the combustion products.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
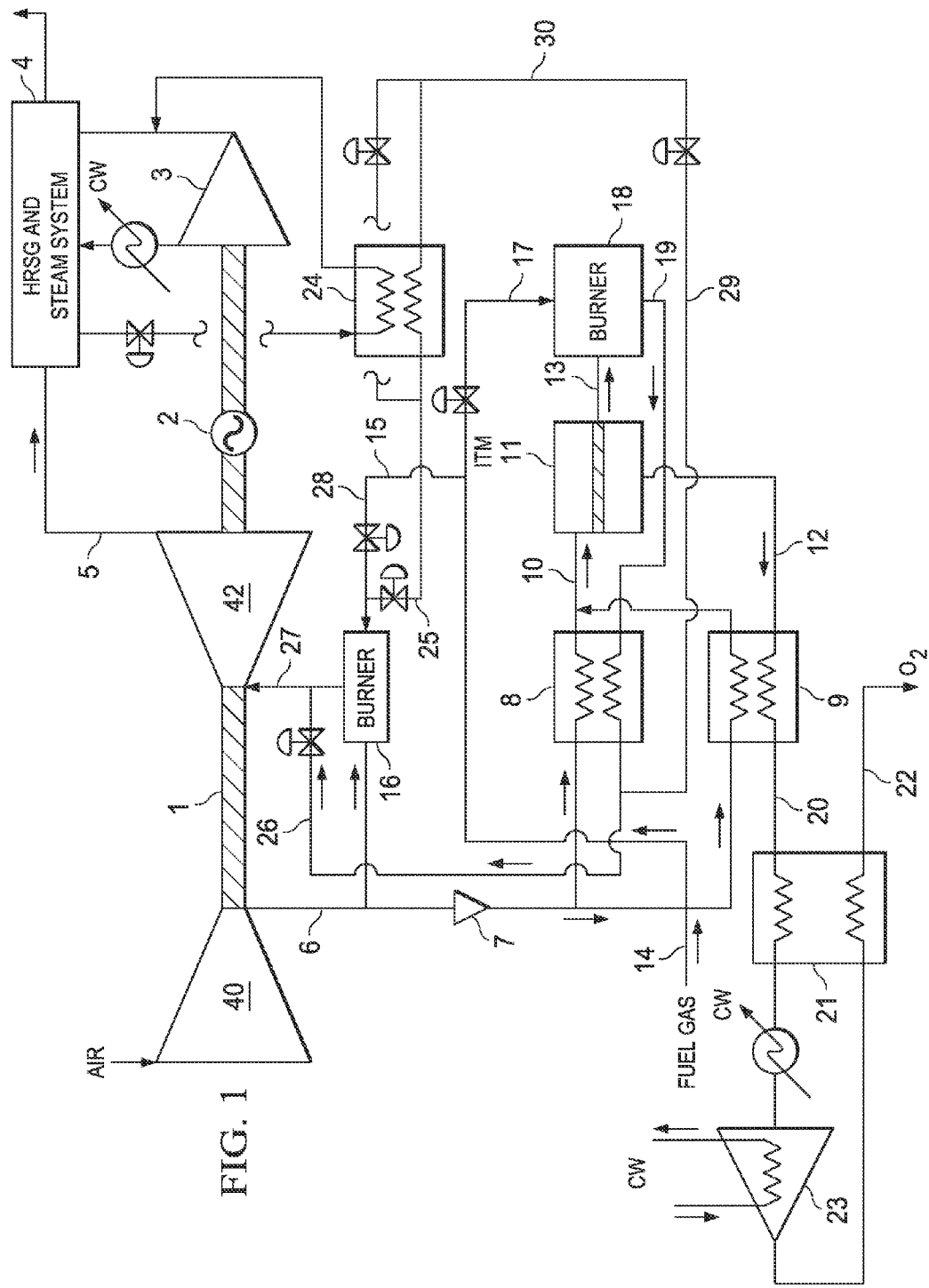
FIG. 1 shows the flow scheme for the process in which all the air flow to the ITM module is taken from the discharge of the gas turbine compressor.

In some implementations, a system may include power generation from a gas turbine in which a carbonaceous or hydro-carbonaceous fuel is gasified using a partial oxidation reaction with pure $O_2$ generated from an ITM unit. Current systems, using coal or petroleum coke or residual bitumen as fuel, typically employ an $O_2$ fired partial oxidation process to convert the carbonaceous fuel to a fuel gas comprising $H_2$+CO together with feed derived impurities such as $H_2S$ and others. This fuel gas stream is cooled and impurities such as $H_2S$ and others are removed. The purified fuel gas is then mixed with nitrogen and optionally steam before being used as fuel in a gas turbine combined cycle power generation system. $O_2$ used for partial oxidation has traditionally been generated by separating air in a cryogenic air separation unit to produce substantially pure $O_2$. The described implementations uses an $O_2$ ion transport membrane (ITM) comprising mixed metal oxides typically in a perovskite crystal structure with vacancies in the $O_2$ ion sites. These structures allow the $O_2$ ions to become mobile in the crystal at high temperatures and the diffusion of $O_2$ across the membrane becomes possible when there is a difference in activity coefficient across the ITM. The ITM membrane then operates as a short circuited electrochemical cell. In order to operate the ITM unit it is necessary to provide a feed air stream at typically 800° C. to 900° C. with a partial pressure of oxygen of 3 to 4 bar in order to achieve $O_2$ separation factors of 70% or more from the feed air in the ITM system and produce sufficient $O_2$ to supply the partial oxidation gasifier. The pure $O_2$ may diffuse through the ITM membrane and may be available at a pressure typically in the range 0.3 to 0.8 bar. The adiabatically compressed air leaving the gas turbine air compressor may be heated to a temperature in the range 800° C. to 900° C. by direct combustion of a fuel in a first combustor. The heated air then passes through an ITM membrane module where some of the $O_2$ in the air is separated. The outlet $O_2$ depleted stream still has sufficient $O_2$ for combustion of more fuel in the second gas turbine combustor which raises the temperature to the design value for entry into the gas turbine expander.

Gas turbines are very expensive to modify and current high output, high efficiency gas turbines, which are commercially available have limited capability to extract a significant proportion of air leaving the air compressor section for external use in an ITM system. In some implementations, the ITM air flow may be taken not only from the gas turbine compressor discharge up to the maximum flow available but also from a separate air compressor with external heating of the compressed air feed to the ITM unit. When burning $H_2$+CO fuel gas, the fuel gas may be diluted primarily with a nitrogen rich gas produced as a by-product of air separation together optionally with steam. This dilution may reduce the flame temperature and thus reduces NOX formation in the combustion. It may also load the turbine to maximize power output. The $O_2$ depleted non-permeate stream leaving the ITM unit may have excess $N_2$ and may be effective as a diluent for the $H_2$ or $H_2$+CO fuel gas flow to the gas turbine burner. A typical system may have a fuel gas entering the gas turbine burner at a pressure in excess of the gas turbine air compressor discharge pressure and a composition of approximately 50% inert diluent and 50% ($H_2$+CO) or $H_2$ on a molar basis. The maximum fuel gas temperature may be limited by the design of the gas turbine fuel handling system and is generally below 450° C. The diluent stream which is the ITM non-permeate leaves the ITM module at 850° C. This stream may be derived from an external air compressor. In general, the combined fuel gas and diluent stream may be at a temperature below about 450° C.

In some implementations, the diluent stream may be cooled to produce high pressure steam for the Rankine steam cycle which may be part of the combined cycle. The air feed stream to the ITM is heated to typically 850° C. by one of two methods:

(a) The direct combustion of fuel gas in the auxiliary air stream. This process may produce sufficient heat to raise the temperature of the air stream plus combustion products to 850° C. To illustrate this method, the following cases may be executed:

(i) The air compressor may be isothermal with a discharge condition of 22 bars 75° C. and provide all or substantially all of the air feed to the ITM unit with no air feed flow from the gas turbine. In this case, about 25% of the oxygen in the air may be consumed in direct fuel combustion, and the air flow may have to be increased by about 33% to compensate; and (ii) The air compressor may be adiabatic with a discharge temperature of 486° C. and can mix with a variable quantity of similar temperature air taken from the gas turbine. About 14% of the $O_2$ may be consumed for fuel combustion with an increased air flow of about 16%. In addition, the compressor power for the adiabatic machine may be 35% higher than the isothermal machine.

The second case (ii) may have a net 18% more power for compression than case (i) but has 45% less heat generated. Based on 1 lb mol air the extra power 0.224 kW hrs/lb mol air compressed, while the saving in heat for case (ii) is 1.27 kW. In general, it may be more efficient to use on an adiabatic air compressor for the external compressor.

(b) It has been proposed that the ITM feed air can be heated from 520° C. to 850° C. in the heat recovery steam generator (HRSG) associated with the gas turbine which would require combustion of more fuel in the gas turbine exhaust to raise its temperature from the range 500° C.-600° C. to the range 900° C.-1000° C. to provide the necessary temperature driving force for heat transfer to the ITM feed air stream. The effect of using fuel gas for direct heating as in case a(ii) compared to indirect heating in the HRSG is to reduce the air flow by 14% saving about 0.174 kW/hrs/lb mol ITM feed air.

The method of indirect heating in the heat recovery steam generator or HRSG may reduce the amount of compressed air flow (no combustion air may be used) but the whole gas turbine discharge flow may be heated from about 600° C. to about 875° C. For a typical integrated gasification combined cycle (IGCC) system, the ITM air flow may be about 25% of the gas turbine air flow when direct combustion heating is used and the ITM module may be designed for 80% $O_2$ recovery. The heat transferred to the ITM air feed may be available to the power cycle at an efficiency (LHV) of about 60% since it produces power in the gas turbine followed by the power produced in the steam system. The remaining heat from the duct firing used to raise the temperature of the gas turbine exhaust to 875° C. may only be available to produce power at about 40% efficiency in the Rankine steam cycle alone. This means that duct firing in the gas turbine exhaust entering the HRSG to allow indirect heating of the ITM feed air stream is a grossly inefficient use of the $H_2$ or ($H_2$+CO) fuel generated in the gasification system. A detailed analysis of the performance of the duct fired HRSG with indirect heating of the ITM feed air stream is given in the examples.

In all of these cases, in order to produce the diluted fuel gas stream at typically 450° C., heat is recovered from the non-permeate ITM stream by cooling from 850° C. and rejecting this heat into the steam system where the maximum efficiency for the recovered heat to produce power is typically 40% and even with supercritical steam conditions will not exceed 44%. For a General Electric 9FA gas turbine linked to a coal based GE/Texaco quench gasifier, the duct firing heat load based on a normal gas turbine exit temperature of 600° C. would be 168 MW. The duct firing produces a hot gas for ITM feed air heating with a heat load requirement of 52.7 MW. Thus, an extra 115.2 MW of fuel gas must be consumed producing power at say 42% instead of 60% efficiency—a loss of 20.7 MW of electrical power.

The proposed prior art process uses the pressurized ITM non-permeate stream as a diluent for the $H_2$ or ($H_2$+CO) fuel gas stream to reduce the combustion temperature to minimise NOX formation and to maximise turbine flow to fully load the turbine. There is a very significant hazard in this proposal since it is necessary to ensure that there will never be any chance of an $O_2$ concentration arising which would exceed the lower flammable limit for the mixture and cause an explosion. If we take a conservative view that the ITM $O_2$ recovery for the direct combustion case with a separate adiabatic air compressor was 70% then the $O_2$ concentration in the proposed diluent would be about 6% $O_2$. This is far too high for safe operation. A level of less than 1% has been accepted in previous IGCC cases, where $N_2$ from a cryogenic ASU is mixed with fuel gases derived from a gasifier, as the maximum $O_2$ concentration permissible in the diluent $N_2$ stream Integration of ITM $O_2$ production modules with existing unmodified gas turbines may include an external air compressor supplying part or all of the air flow for $O_2$ production. In some implementations, the proposed system may allow all or substantially all of the fuel gas combustion heat used for air preheating to be recovered at the gas turbine combustion heat input level so that recovered heat can produce electrical power at 55% to 60% net efficiency. Alternatively or in addition, the fuel gas may be effectively diluted with a nitrogen rich diluent and supplied at a temperature below 500° C. without loss of efficiency caused by transferring heat to the steam system. In addition, the oxygen content of the diluent stream may be reduced to a concentration at the ITM exit to reduce safety hazards when diluent and $H_2$ or ($H_2$+CO) fuel gas at elevated temperature are mixed. Also, the mixture of $H_2$ or ($H_2$+CO) fuel gas and diluent may be within an LHV value for satisfactory combustion in a gas turbine. The range may be for LHV values to be greater than about 120 Btu/scf and that the diluted fuel gas mixture may be at the maximum or otherwise an upper temperature allowed by the gas turbine vendor.

In some implementations, an ITM $O_2$ generation system coupled to a standard gas turbine modified to burn $H_2$ or $H_2$ rich fuel gas may be designed to include or execute one or more of the following: (1) the oxygen production may be sufficient to provide the $O_2$ required for a gasifier or other process consuming $O_2$ (e.g., an IGCC process which converts a carbonaceous or hydro-carbonaceous fuel to $H_2$ or a $H_2$ rich fuel gas with or without carbon dioxide capture and provides sufficient clean fuel gas to power the gas turbine); (2) the $H_2$ fuel gas may be diluted with inert gas to reduce NOX level and provide sufficient fuel gas to load the gas turbine but the LHV heating value of the fuel gas may be above 120 Btu/scf to favour combustion; (3) all or substantially all of the fuel gas used for heating air to ITM operating temperature of typically 850° C. may be used as part of the fuel gas input to the gas turbine even in the case when the ITM feed air stream is provided from a separate air compressor; (4) to maximize or otherwise increase $O_2$ production from a given ITM feed air flow the air may be heated indirectly; (5) the oxygen permeate and non-permeate streams leaving the ITM unit may be transfer the maximum or increased quantity of heat to or become part of the feed streams to either the gas turbine combustor or the upstream gasifier and, in some cases, any high grade heat transferred to the steam system may be minimized or otherwise reduces; (6) the maximum or upper temperature of the diluted $H_2$ feed gas to the gas turbine combustor may be 450° C. and the maximum or upper $O_2$ feed gas temperature to the gasifier may be 350° C.; (7) the $O_2$ content of the diluent to the $H_2$ fuel gas may be 2.5% $O_2$ to prevent possible ignition and explosion (e.g., $O_2$ content below 1% molar); (8) depending on the amount of side-draw air that can be withdrawn from the gas turbine, an air compressor in parallel to the gas turbine compressor may be included to make-up air feed to the ITM module. One or more of these objectives may be achieved by the following ITM gas turbine integration.

The ITM module may be fed with adiabatically compressed air drawn from the gas turbine air compressor discharge or a separate air compressor or both together. The gas turbine side-draw air stream which may form part or all of the air feed to the ITM module may be raised in pressure so that the non-permeate stream which is depleted in $O_2$ is at a sufficiently high pressure to be mixed with the gas turbine fuel gas stream, which passes through a regulation system and through the burner nozzles before mixing with the main gas turbine compressed air stream. In practice, the pressure may be raised in a single stage compressor by 2 bar to 5 bar. Air compressed isothermally in a separate air compressor may be heated by indirect heat transfer with the $O_2$ permeate stream from the ITM module in a first stage heat exchanger then mixed with any side-draw air from the gas turbine compressor discharge following compression. The non-permeate stream leaving the ITM module may be raised to a temperature in the range 850° C. to 950° C. in a directly fired combustor using diluted fuel gas. The total ITM feed air stream may then be heated by indirect heat transfer in a heat exchanger against the heated ITM non-permeate stream to raise its temperature in a range from about 800° C. to about 900° C. The ITM non-permeate stream may be heated by direct combustion of fuel gas to raise the temperature to a level sufficiently high to achieve two objectives: (2) to heat the ITM inlet air to 850° C.; and (2) to achieve an exit temperature from the air pre-heater for the non-permeate stream to ensure that when all or part of this stream is used as diluent for the fuel gas, which is close to ambient temperature the resulting mixed temperature is at 450° C. By partially removing $O_2$ from the non-permeate stream by oxidising fuel gas in the combustor, the resultant $O_2$ concentration may be kept below 2.5% $O_2$ (e.g., below 1% molar).

There may be an excess of non-permeate gas which is not needed or otherwise used for fuel gas dilution. This may be reduced in pressure and added to the gas turbine air compressor discharge or injected into the mixing section of the gas turbine combustors. Optionally, the two heat exchangers may be in parallel rather than in series. In a parallel arrangement the oxygen permeate stream which is at sub-atmospheric pressure, typically about 0.3 to 0.8 bar, may be passed through a heat exchanger which heats part of the air feed to the ITM unit. In a typical application, part of the ITM feed air may be heated to 820° C. against $O_2$ at 850° C. and the parallel heat exchanger may heat the remaining ITM air feed stream against heated non-permeate stream to a higher temperature than 850° C. so that total air stream after mixing was at about 850° C. The low pressure $O_2$ stream may then pass into a second heat exchanger which heats the compressed $O_2$ feed for the gasifier to about 350° C.

The system shown in FIG. 1 uses a gas turbine 1 coupled to an electric generator 2 which is also coupled to a steam turbine 3. The steam is generated in a heat recovery steam generator 4 which includes boiler feed-water treatment and pumps and which is heated by the gas turbine exhaust stream 5. Part of the air which has been adiabatically compressed in the gas turbine compressor 40 at 18 bar is compressed to 22 bar in compressor 7. The air stream is heated in the parallel heat exchangers 8 and 9 to form a mixed steam 10 with a temperature of 850° C. The air enters an ITM module 11 where an oxygen stream 12 is separated at a pressure of, for example, 0.6 bar leaving a non-permeate stream 13. A fuel gas stream 14 is divided into two streams. One stream 15 is the fuel for the gas turbine combustor 16 and the second stream 17 is the fuel for a combustor 18 in which the non-permeate stream 13 is heated to 1380° C. and leaves as stream 19 with an oxygen content of, for example, 1% molar. The oxygen permeate stream cools to 500° C. in heat exchanger 9 and the non-permeate stream cools to 860° C. The oxygen stream 20 leaving 9 is cooled in heat exchanger 21 where it heats the product oxygen stream 22 at 65 bar to 350° C. The intercooled compressor 23 raises the oxygen pressure from 0.35 bar to 65 bar. The non-permeate stream 29 leaving the heat exchanger 8 is cooled in heat exchanger 24 to a temperature at which part 25 can be mixed with the fuel gas stream 15 to give 50% fuel gas+50% diluent fuel gas stream which is at a mixed temperature which is below a maximum or predefined fuel stream inlet temperature specified by the gas turbine vendor which in this case is 450° C. The remaining non-permeate stream 26 is mixed with the exhaust as from the as turbine burner 16 and supply to the expander 42. Steam can be generated and/or superheated in heat exchanger 24 to increase the power produced in the steam turbine 3. Note that in order to simultaneously achieve the required temperature and composition of the mixed fuel gas stream 28 which is entering the gas turbine combustor 16, the stream 29 can be divided so that part 30 bypasses the heat exchanger 24.

Figure 2:
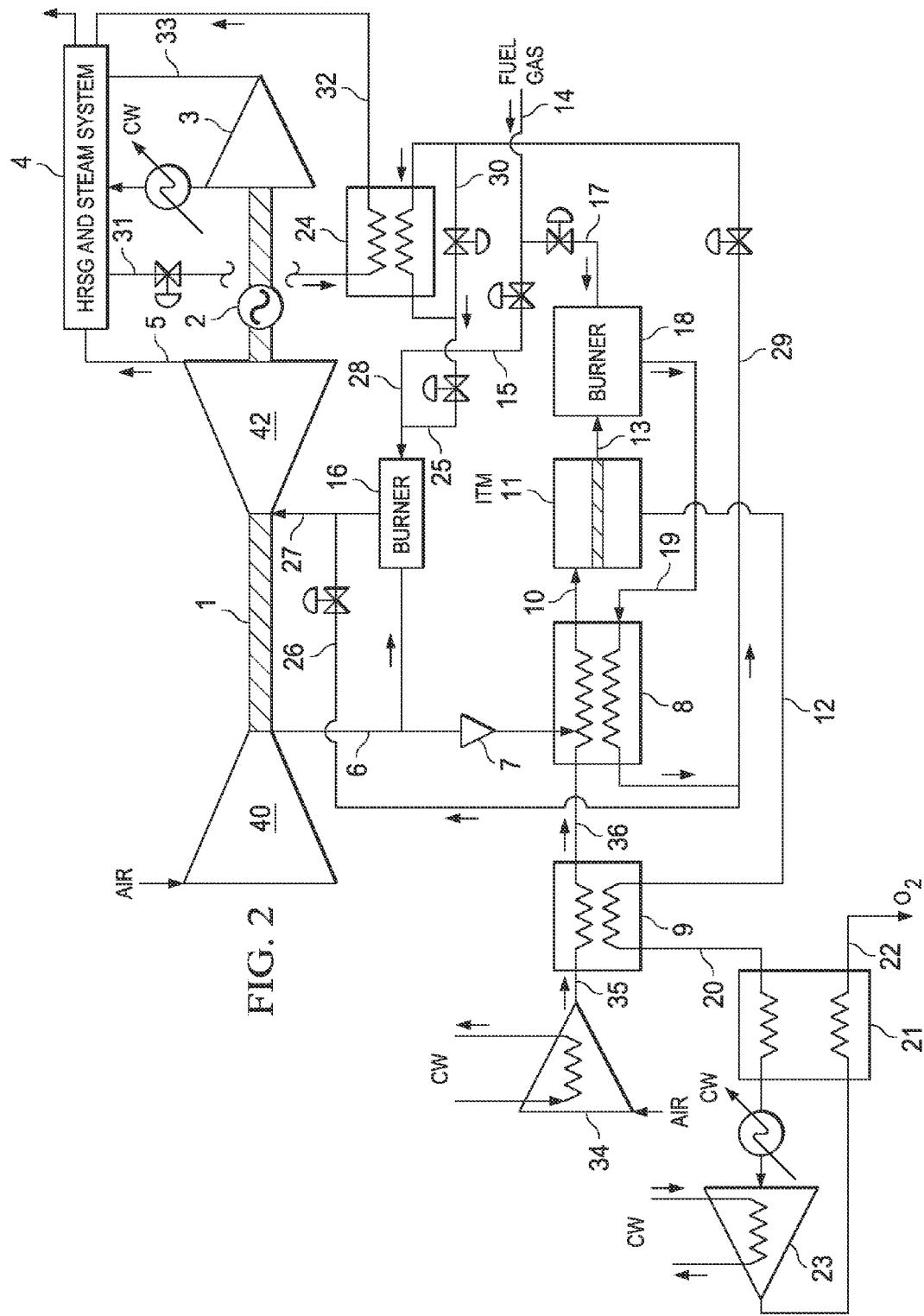
FIG. 2 shows the flow scheme for the process in which there is an external air compressor which together with air flow taken from the discharge of the gas turbine air compressor provides all the air feed to the ITM module.

The system shown in FIG. 2 is very similar to the system shown in FIG. 1 with the addition of an external intercooled air compressor 34 which produces half of the total ITM feed air flow 10 as stream 35 at a pressure 0.5 bar higher than the pressure of the gas turbine air side-draw flow leaving the compressor 7 and at a temperature of 75° C. Stream 35 is heated to 192° C. in heat exchanger 9 which cools the oxygen permeate stream 12 at 0.6 bar from the ITM module 11 to 500° C. from 850° C. The oxygen stream 20 leaving heat exchanger 9 is used in heat exchanger 21 to heat the compressed oxygen stream at 65 bar from the compressor 23 to a temperature of 350° C. The externally compressed air stream 36 leaving heat exchanger 9 is heated to about 500° C. in heat exchanger 8 and at this point it is mixed with the gas turbine side-draw air stream which is also at about 500° C. The mixed total air feed stream is then heated to 850° C. The heating medium in heat exchanger 8 is the heated non-permeate stream from the ITM module. The remaining parts of the system are identical to those shown in FIG. 1.

An approximate scaling exercise is based on published data for Pittsburg No 8 coal used in an IGCC system with carbon monoxide sour shift reactors and 75% CO2 capture. The system may use GE 9FA gas turbines, cryogenic $O_2$ production and a Texaco quench gasifier with $CO_2$ capture. Fuel gas dilution may be with steam and some $CO_2$. The base case performance follows:

Gross power (gasturbine+steam turbine+expansion turbine)=481 Mw
Cryogenic ASU power=47.7 Mw
Internal power consumption=14.1 Mw
Net power output=419.2 Mw
Net efficiency(LHV)=39%

Using the system described above with an ITM module and an oxygen compressor in place of the cryogenic oxygen plant may gave the following results:

1. All ITM air taken from the gas turbine air compressor outlet
   Net Power=466.6 Mw
   Net Efficiency=40.52%
2. Half ITM air from the gas turbine and half from a separate air compressor
   Net power=462.3Mw
   Net efficiency=41.37%
3. All ITM air taken from an separate air compressor
   Net power=448.4Mw
   Net efficiency=41.2%.

A number of embodiments of the invention have been described. Nevertheless, it will be understood that various modifications may be made without departing from the spirit and scope of the invention. For example, an approximate scaling exercise based on published data for coal IGCC using 9FA gas turbines, cryo $O_2$ and a Texaco quench gasifier with $CO_2$ capture showed an efficiency increase (LHV basis) from 39% to 41.65% with a power output increase of 6.8%. Accordingly, other embodiments are within the scope of the following claims.

What is claimed is:

1. A system, comprising:
   a gas turbine including a turbine compressor, wherein the turbine compressor discharges an air stream in connection with compressing air used during combustion;
   a separate air compressor configured to receive the air stream and compress the air stream to generate a pressurized stream;
   a first heat exchanger configured to receive at least a first portion of the pressurized stream and indirectly heat the first portion using heat from an oxygen stream from an Ion Transport Membrane (ITM);
   a second heat exchanger configured to receive at least a second portion of the pressurized stream and indirectly heat the second portion to an ITM inlet temperature using heat from a heated non-permeate stream from the ITM which has been further heated;
   the ITM configured to receive a combination of the heated first portion and the heated second portion and generate the oxygen stream and the non-permeate stream, wherein the non-permeate stream is passed to a fuel gas burner and the oxygen stream is passed to the first heat exchanger;
   the fuel gas burner configured to receive the non-permeate stream and combust a fuel gas in combination with the non-permeate stream to generate the heated non-permeate stream and pass the heated non-permeate stream to the second heat exchanger;
   a conduit configured to receive a cooled non-permeate stream from the second heat exchanger and introduce the cooled non-permeate in a gas turbine burner; and
   the gas turbine burner which combusts a fuel gas mixed with at least a portion of the cooled non-permeate stream in air, wherein a temperature of the combination of mixture of fuel gas and the cooled non-permeate stream is below a predefined threshold temperature for the gas turbine burner, and a concentration of oxygen in the cooled non-permeate stream is such that when mixed with a fuel gas results in an oxygen concentration below a lower flammable limit of the mixture.

2. The system of claim 1, wherein 40% and 60% of the combination is received from an air compressor which is separate from the gas turbine.

3. The system of claim 1, wherein the heated non-permeate stream has a temperature about 800° C. or higher.

4. The system of claim 1, wherein the concentration of oxygen of the cooled non-permeate stream is about below 2.5% or less molar concentration.

5. The system of claim 1, wherein the combination has a temperature range from about 800° C. to about 900° C.

6. The system of claim 1, wherein the air stream discharged from the gas turbine compressor as part of the air feed for the ITM is compressed in a pressure range from about 2 bars to 10 bars.

* * * * *